United States Patent [19]
Ebrahimi

[11] Patent Number: 5,835,237
[45] Date of Patent: Nov. 10, 1998

[54] VIDEO SIGNAL CODING METHOD AND APPARATUS THEREOF, AND VIDEO SIGNAL DECODING APPARATUS

[75] Inventor: Touradj Ebrahimi, Tokyo, Japan

[73] Assignee: Sony Corporation, Tokyo, Japan

[21] Appl. No.: 557,132

[22] PCT Filed: Apr. 20, 1995

[86] PCT No.: PCT/JP95/00781

§ 371 Date: Sep. 12, 1996

§ 102(e) Date: Sep. 12, 1996

[87] PCT Pub. No.: WO95/29462

PCT Pub. Date: Nov. 2, 1995

[30] Foreign Application Priority Data

Apr. 22, 1994 [JP] Japan .................................. 6-107943

[51] Int. Cl.$^6$ ....................................................... H04N 1/40
[52] U.S. Cl. ........................................... 358/448; 358/458
[58] Field of Search .................................... 358/448, 458, 358/465–466; 348/252, 625; 382/199, 242, 266

[56] References Cited

U.S. PATENT DOCUMENTS

| | | | |
|---|---|---|---|
| 3,813,646 | 5/1974 | Quarmby | 340/146.3 |
| 4,631,574 | 12/1986 | LoCicero et al. | 358/12 |
| 4,743,959 | 5/1988 | Frederiksen | 358/11 |
| 4,967,079 | 10/1990 | Shimura | 250/327.2 |
| 4,974,071 | 11/1990 | Maeda | 358/80 |
| 5,568,565 | 10/1996 | Minakata | 382/187 |

FOREIGN PATENT DOCUMENTS

| | | |
|---|---|---|
| 62-106589 | 5/1987 | Japan . |
| 63-115468 | 5/1988 | Japan . |
| 3-164876 | 7/1991 | Japan . |

OTHER PUBLICATIONS

Proceedings, IEEE International Conference on Acoustics, Speech and Signal Processing No. 3 (1992), "Adaptive DCT Image Coding Based on a Three–Component Image Model", Xiaonong Ran and Nariman Farvardin, pp. III.201—III.204.

Proceedings, IEEE International Conference on Acoustics, Speech and Signal Processing No. 4 (1990), "A Three–Source Multirate Model for Image Compression", Steven L. Eddins and Mark J. T. Smith, pp. 2089—2092.

(List continued on next page.)

*Primary Examiner*—David K. Moore
*Assistant Examiner*—Stephen Brinich
*Attorney, Agent, or Firm*—Frommer Lawrence & Haug LLP; William S. Frommer

[57] ABSTRACT

A video signal coding method and apparatus thereof and a video signal decoding apparatus of the present invention improves visual picture quality of a decoded image with higher compression rate than ever. A video signal (S1) is resolved into local luminance information composed of the smooth component, edge information composed of contour component, and texture information composed of component other than the smooth component and the contour component corresponding to each different visual importance. Then, the local luminance information is coded (S2) by a coding method which restores all of the local luminance information, the edge information is coded (S4) by a coding method by chain information and amplitude information, and the texture information is coded by a coding method having higher compression rate compared with the local luminance information (S2) and the edge information (S4). The coding can therefore be performed with higher compression rate than ever and in consideration of the visual picture quality of the restored image.

23 Claims, 16 Drawing Sheets

OTHER PUBLICATIONS

IEEE International Conference on Acoustics, Speech, and Signal Processing, 1993, "Three–Component Image Compression with Frequency–Weighted Texture Coding and Edge Modeling", Eddins, S.L., vol. 5, pp. 369–372.

International Conference on Image Processing and its Applications, Apr. 7–9, 1992, Maastricht, Netherlands, "Sketch and Texture Coding Approach to Monochrome Image Coding", Subramanian, N., et al., pp. 29–32.

IEEE Transactions on Image Processing, Apr. 1995, vol. 4 No. 4, "A Perceptually Motivated Three–Component Image Model–Part II: Applications to Image Compression", Ran, X., et al., pp. 430–477.

Signal Processing, Jul. 1988, Netherlands, vol. 15, No. 1, "Sketch Based Coding of Grey Level Images", Carlsson, S., pp. 57–83.

Proceedings of Melecon '83, Mediterranean Electrotechnical Conference, Athens, Greece, May 24–26, 1983, vol. 2, "A Contour–Texture Approach to Picture Coding", Kocher, M., et al., pp C2.03/1–2.

IEEE Transactions on Pattern Analysis and Machine Intelligence, vol. PAMI–08, No. 6 , Nov. 1986, "A Computational Approach to Edge Detection", Canny, J., pp. 679–698.

Pattern Recognition Letters, vol. 11, No. 2 , Feb. 1, 1990, "Contour Coding for Imaging Description", Grattoni, P., et al., pp. 95–105.

Proceedings, IEEE International Conference on Acoustics, Speech and Signal Processing, No. 3, 1992, pp. III. 201—III. 204.

Proceedings, IEEE International Conference on Acoustics, Speech and Signal Processing, No. 4, 1990, pp. 2089–2092.

SHARP EDGE

SMOOTH EDGE

VERY SMOOTH EDGE

HIGH CONTRAST

LOW CONTRAST

ORIGINAL SIGNAL

FIRST DERIVATIVE
(ABSOLUTE VALUE)

SECOND DERIVATIVE

DOMINANT POINT
(MAXIMUM VALUE)

STEP EDGE
INCLUDING NOISE

SMOOTHED DATA

VALUES OF GRADIENT FUNCTION
AND ADAPTIVE THRESHOLD

CANDIDATES OF
SINGULAR POINTS

DOMINANT POINTS

RESULT OF
RECONSTRUCTION

ORIGINAL SIGNAL

GRADIENT AND
ADAPTIVE THRESHOLD

CHANGE POINTS

RESULT OF REMOVAL
AND REPLACEMENT
OF REDUNDANT POINTS
(DOMINANT POINTS)

ORIGINAL SIGNAL

CANDIDATE POINTS

RESULT OF
CHANGE DETECTION

RESULT OF REMOVAL AND
REPLACEMENT OF
REDUNDANT POINTS
(DOMINANT POINTS)

STEP EDGE
INCLUDING NOISE

SMOOTHED DATA

EDGE POSITION

RESULT OF
RECONSTRUCTION

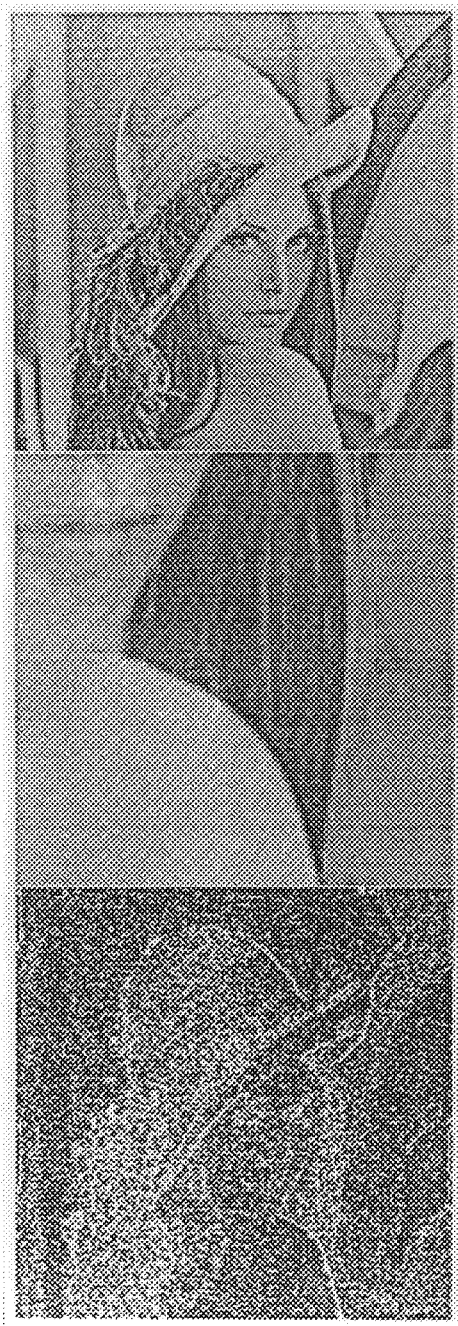
FIG. 22 (A)
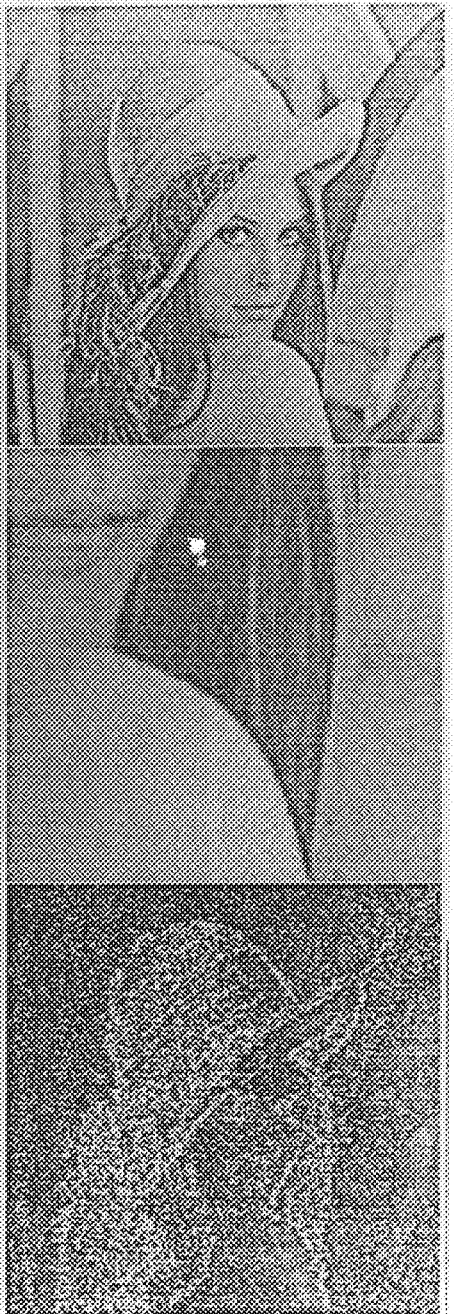
FIG. 22 (B)
FIG. 22 (C)
FIG. 22 (D)
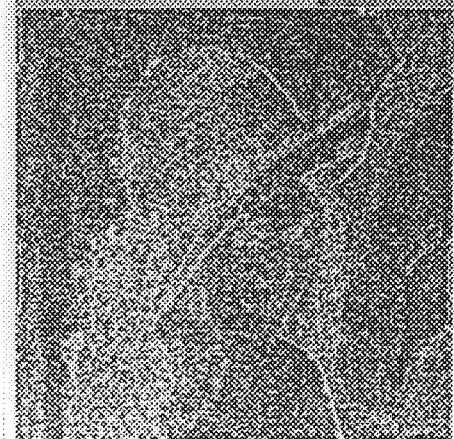
FIG. 22 (E)
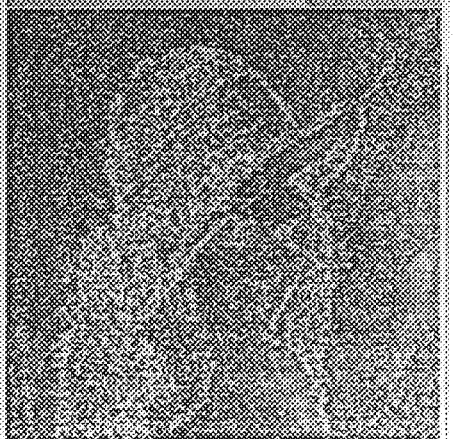
FIG. 22 (F)

VIDEO SIGNAL CODING METHOD AND APPARATUS THEREOF, AND VIDEO SIGNAL DECODING APPARATUS

TECHNICAL FIELD

The present invention relates to a video signal coding method and an apparatus thereof, and a video signal decoding method and an apparatus thereof, and more particularly is applicable to which decompose the video signal into plural components in consideration of visual importance of the video signal and then code and decode it. Further, the present invention relates to an edge detecting method and an apparatus thereof which is suitable for aforesaid decomposition.

BACKGROUND ART

Conventionally, transformation coding is widely used for image compression. The success of these techniques, beside their energy compaction properties resides in the fact that the distortions due to compression appear in an indirect manner in the spatial domain, namely through the frequency domain components. This leads into a more pleasant distortion, in general. However, the frequency domain distortions in areas containing edges for instance, lead into less desirable artifacts, such as ringing. A solution to reduce this drawback is to classify different regions of the image (commonly square blocks), and to apply different quantization strategies, to each distinct class.

The criterion of classification is of great importance. A measure of the activity based on the AC values of the transform coefficients of each region (block) is usually used. Classification based on activity of AC coefficients is rather good to discriminate between smooth regions and other regions with higher frequency contents. But this technique does not work properly to separate regions containing edges and regions having texture-like activities.

Although, in general frequency domain distortions are invisible in textures, they become very much visible in presence of edges, because of the ringing artifacts mainly. A good classification should therefore be able to classify edge regions and texture regions appropriately, in order to apply more efficient coding strategies into each class in a further stage. More sophisticated activity detections, based on AC coefficients values may be thought in order to cope with this situation. This will however increase the complexity of the system quite a bit, if an efficient strategy is to be found.

DISCLOSURE OF THE INVENTION

In view of the foregoing, the present invention is to provide a video signal coding method and an apparatus thereof and a video signal decoding method and an apparatus thereof which can be improve visual picture quality of the restored image with higher compression rate then ever.

To solve the problem, in the present invention, a local luminance component composed of smooth component of an input video signal is coded by utilizing a first coding method; luminance edge component composed of contour component of the input video signal is coded by utilizing a second coding method by chain coding; and a texture component composed of the component other than the local luminance component and the luminance edge component is coded by utilizing a third coding method.

Further, the present invention provides first coding means for generating a first coded signal by coding the local luminance component composed of the smooth component of the input video signal by utilizing the first coding method; second coding means for generating a second coded signal by coding the luminance edge component composed of the contour component of the input video signal by utilizing the second coding method of chain coding; and third coding means for generating a third coded signal by coding the texture component composed of the component other than the local luminance component and the luminance edge component of the input video signal by utilizing the third coding method.

Further, in a video signal decoding method of the present invention for reconstructing the video signal by utilizing the first coded signal generated by coding the local luminance component composed of the smooth component of the input video signal including at least luminance component, the second coded signal generated by coding the luminance edge component composed of the contour component of the input video signal by utilizing the second coding method by the chain coding, and the third coded signal generated by coding the texture component composed of the component other than the local luminance component and the luminance edge component of the input video signal by utilizing the third coding method, wherein: the first coded signal is decoded to generate a reconstruction local luminance; the second coding signal is decoded to generate a reconstruction edge; the edge image is reconstructed based on the reconstruction local luminance component and reconstruction edge component; the third coded signal is decoded to generate a reconstruction texture; and the edge image and the reconstruction texture is added to reconstruct original video signal.

Further, in a video signal decoding apparatus of the present invention for reconstructing the video signal by utilizing the first coded signal generated by coding the local luminance component composed of the smooth component of the input video signal including at least luminance component, the second coded signal generated by coding the luminance edge component composed of the contour component of the input video signal by utilizing the second coding method by the chain coding, and the third coded signal generated by coding the texture component composed of the component other than the local luminance component and the luminance edge component of the input video signal by utilizing the third coding method, comprising: first decoding means for decoding the first coded signal to generate a reconstruction local luminance; second decoding means for decoding the second coded signal to generate a reconstruction edge; means for reconstructing an edge image based on the reconstruction local luminance component and reconstruction edge component; third decoding means for decoding the third coded signal to generate a reconstruction texture; and adding means for adding the edge image and the reconstruction texture to reconstruct the original video signal.

Further, in an edge detecting method of the present invention for detecting the edge of the input video signal, comprising: a process of differentiating the input video signal; a process of comparing the differentiated result by the differentiating process with a threshold value adaptively controlled to extract the component more than the threshold value from the differentiated result; a process of detecting a change point from the extracted component; and a process of determining a singular point based on the change point.

Further, in an edge detecting apparatus of the present invention for detecting the edge of the input video signal, comprising: differentiation means for differentiating the input video signal; means for comparing the differentiated result by the differentiating means with a threshold value adaptively controlled to extract the component more than the threshold value from the differentiated result; means for detecting a change point from the extracted component; and means for determining a singular point based on the change point.

The video signal is resolved into the local luminance information composed of the smooth component, the edge information composed of the contour component, and the texture information composed of the component other than the smooth component and the contour component, and the different coding is performed on each of them corresponding to each visual importance, so that the coding can be performed with higher compression rate than ever and in consideration of the visual picture quality of the restored image. Also, the edge information is detected in consideration of the reconstruction.

Further, the coded local luminance information is decoded to generate the reconstruction local luminance, the coded edge information is coded to generate the reconstruction edge information, and the edge image generated based on the reconstruction local luminance and the reconstruction edge information are added to the decoded texture information to reconstruct the original image, so that the coded data can be surely decoded in consideration of visual picture quality of the restored image.

BRIEF DESCRIPTION OF THE DRAWINGS

FIG. 21(A) shows the video signal of the original image. FIG. 21(B) shows the reconstructed local luminance component. FIG. 21(C) shows the edge information. FIG. 21(D) shows the edge information after the postprocessing. FIG. 21(E) shows the reconstructed edge image. FIG. 21(F) shows the texture component.

FIG. 22 shows comparison between 3CC and JPEG. FIG. 22(A) shows the decoded image by 3CC. FIG. 22(B) shows the decoded image by JPEG. FIG. 22(C) shows the image in which the region of shoulder of the decoded image is enlarged by 3CC. FIG. 22(D) shows the image in which the region of shoulder of the decoded image is enlarged by JPEG. FIG. 22(E) shows an error image of the decoded image by 3CC. FIG. 22(F) shows an error image of the decoded image by JPEG.

FIG. 23(A) shows the original image. FIG. 23(B) shows the singular point obtained by a new edge detecting apparatus. FIG. 23(C) shows each amplitude of the data reconstructed from the singular point which is after repeating for thirty times by using the diffusion process and the singular point to the original image.

FIG. 24(A) shows the original image. FIG. 24(B) shows the singular point obtained by the canny edge detecting apparatus. FIG. 24(C) shows each amplitude of the data reconstructed from the singular point which is after repeating for thirty times by using the diffusion process and the singular point to the original imager.

BEST MODE FOR CARRYING OUT THE INVENTION

Preferred embodiments of the present invention will be described with reference to the accompanying drawings.

(1) Principle of three-component coding and decoding method

In this embodiment, chrominance image is compressed by using a three-component coding method (hereinafter referred to as 3CC (3 Component Coding)) in consideration of visual relativity of the image information to be coded. Therefore, the image information is decomposed into three different components, that is, local luminance composed of smooth components, edge information composed of contours, and texture information composed of the other components. The visual importance of these components become larger from the latter toward the former, and allowable distortion in each component changes in accordance with this visual importance. Further, in accordance with those different characteristics, different coding methods are applied to the coding of respective components.

It can be said that this 3CC is a good coding method for classifying the image regions suitably. This method is so efficient for the complicacy of calculation that can be replaced conventional method for detecting activities based on coefficient AC value. The fundamental idea of 3CC is simple and so general (X. Ran and N. Farvardin. Low bitrate image coding using a three component image model. Technical Report TR 92–75, University of Maryland, 1992.).

In the coding method by 3CC, at first an original image is decomposed into three different components, namely, a local luminance, an edge information, and a texture information. There are several methods to extract these components, each of which generates different results respectively. Besides the method for extracting each component, a bitrate which can be used in a specified coding method and between different components is specifically important for entire quality of decoded image. For example, amplitude of the edge is not so important as the edge position. Therefore, although the amplitude information is made quantized simply and roughly, it is enough to obtain visually comfortable image. On the other hand, the edge position information have to be precise as possible.

Further, another feature of 3CC is to operate more suitable in more wide application (generic coding). For example, in an application having extremely low bitrate, storage of not the texture information but the edge information permits restoration of the image which is more comfortable visually. This is because the contour information is not affected seriously, which is different from conventional coding methods. Further, both the local luminance and the edge information can be decoded by arbitrary resolution without high-level processing. Therefore, coding of the texture information by using multiresolution can realize multiresolution coding easily. This embodiment provides new 3CC which can realize high-efficiency transmission with simple construction by further improving aforementioned 3CC.

Figure 1:
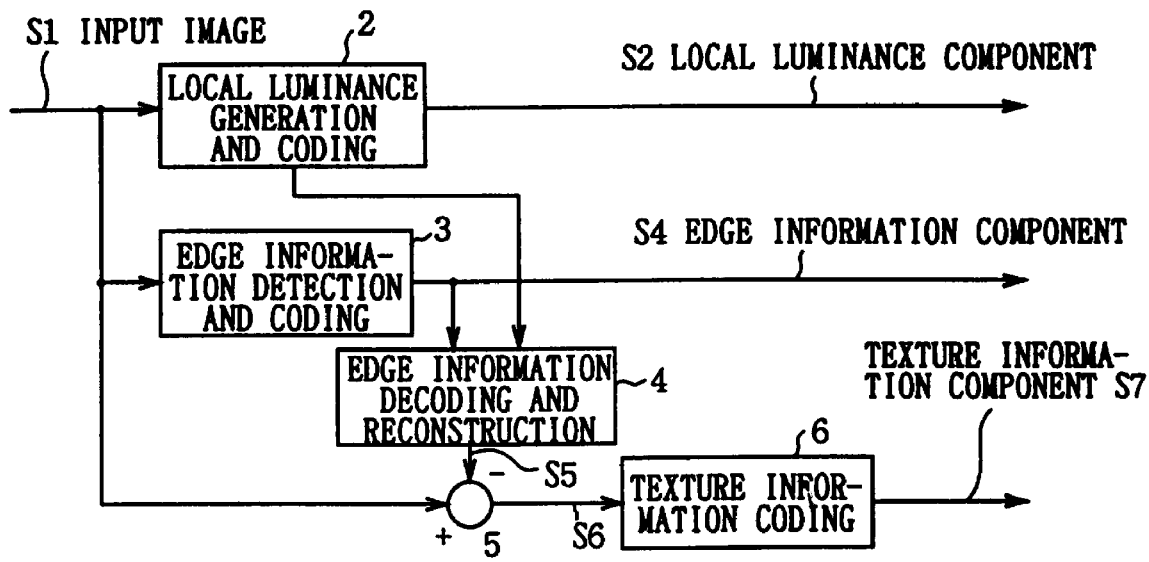
FIG. 1 is a block diagram showing an embodiment of a video signal coding apparatus according to the present invention.

(2) Video signal coding apparatus and video signal decoding apparatus by new 3CC In FIG. 1, 1 generally shows a video signal coding apparatus by 3CC. Here, the coding of luminance signal out of the video signal will be described. Although the coding of chrominance signal out of the video signal is same as the coding of the luminance signal, there is a little difference. The video signal coding apparatus which performs coding of the chrominance signal will be described later.

The video signal coding apparatus 1 is composed of a local luminance generation and coding processing unit 2, an edge information detection and coding processing unit 3, an edge information decoding and reconstruction processing unit 4, a subtraction processing unit 5, and a texture information coding processing unit 6. Brightness signal S1 of input video signal is input to the local luminance generation and coding processing unit 2, the edge information detection and coding processing unit 3, and the subtraction processing unit 5, respectively.

Figure 2:
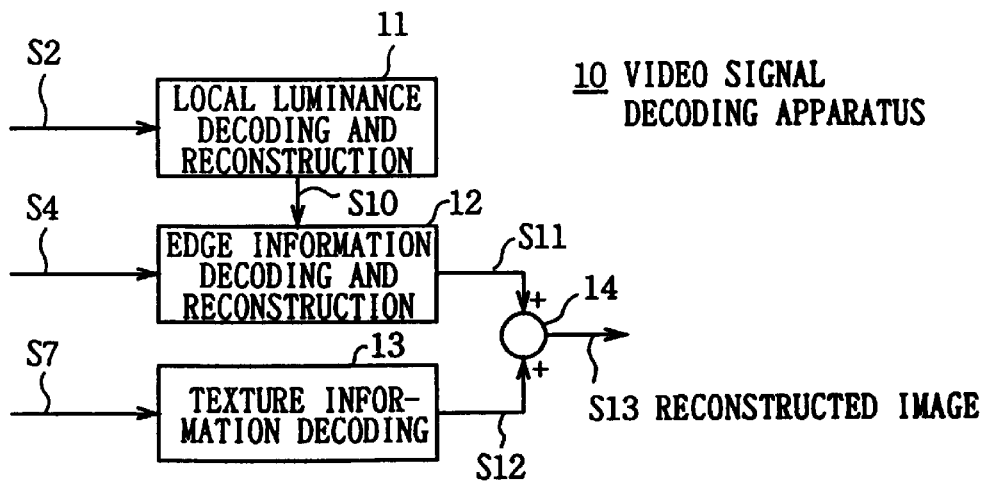
FIG. 2 is a block diagram showing an embodiment of a video signal decoding apparatus according to the present invention.

On the other hand, in FIG. 2, 10 generally shows a video signal decoding apparatus by 3CC which is composed of a local luminance decoding and reconstruction processing unit 11, an edge information decoding and reconstruction processing unit 12, a texture information decoding processing unit 13 and an addition processing unit 14 to which the local luminance component S2, the edge information component S4, and the texture information component S7 are respectively input.

Figure 3:
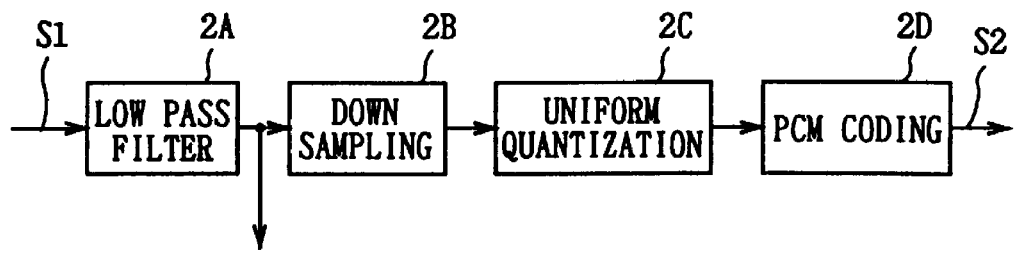
FIG. 3 is a block diagram showing a local luminance generation and coding processing unit in the video signal coding apparatus of FIG. 1.

Here, as shown in FIG. 3, the local luminance generation and coding processing unit 2 of the video signal coding apparatus 1 is composed of a low pass filter 2A, a down sampling unit 2B, an uniform quantization unit 2C and a PCM coding unit 2D. In the local luminance generation and coding processing unit 2, in order to obtain local luminance, at first the original luminance signal S1 is filtered by a Gaussian-like low pass filter 2A and then is down sampled at the down sampling unit 2B by an appropriate factor. Incidentally, the local luminance output from the low pass filter 2A is also supplied to the edge information decoding and reconstruction processing unit 4.

Figure 4:
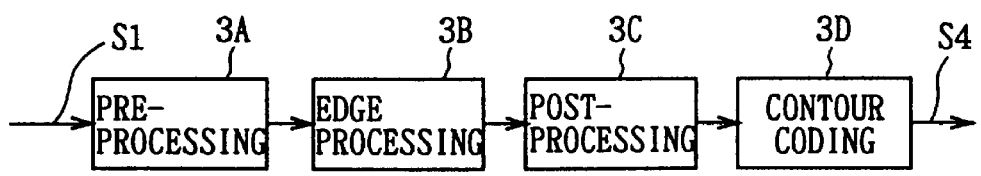
FIG. 4 is a block diagram showing an edge information detection and coding processing unit in the video signal coding apparatus of FIG. 1.

Because of the importance of this local luminance component, the coefficients resultingly generated at the uniform quantization unit 2C is equally quantized, and then is coded at the PCM coding unit 2D at N-bit/coefficient (N is typically between 8 to 12 bits). The result of this stage corresponds to the DC value of transform based coding. In this manner, in the local luminance generation and coding processing unit 2, local luminance of the luminance signal S1 is coded to send as the local luminance component S2. As shown in FIG. 4, the edge detection and coding processing unit 3 is composed of a preprocessing unit 3A, an edge detection processing unit 3B, a postprocessing unit 3C and a contour coding processing unit 3D. The first preprocessing unit 3A is performed in order to reduce the influence of noise and texture information to the quality of when detecting the edge. This stage may contain not only a more sophisticated space-variant filtering with stronger effect at texture area an weak or no effect at edges but also a simple low pass filter. Next edge detection processing unit 3B is an important step along with reconstruction of the edge image. A new method concerning edge detection and image reconstruction from the edge information will be described later. The new edge detection processing is used at this level. However, all other processing methods for reconstructing an image from the edge information can also be used at this stage. Furthermore, the postprocessing unit 3C removes isolated or less relevant edge and connect contours which are disconnected from each other due to noise. In this postprocessing unit 3C, a threshold value is set to the degree of intensity in accepting or rejecting relevant edge information in order to control the bitrate of the edge information.

Figure 5:
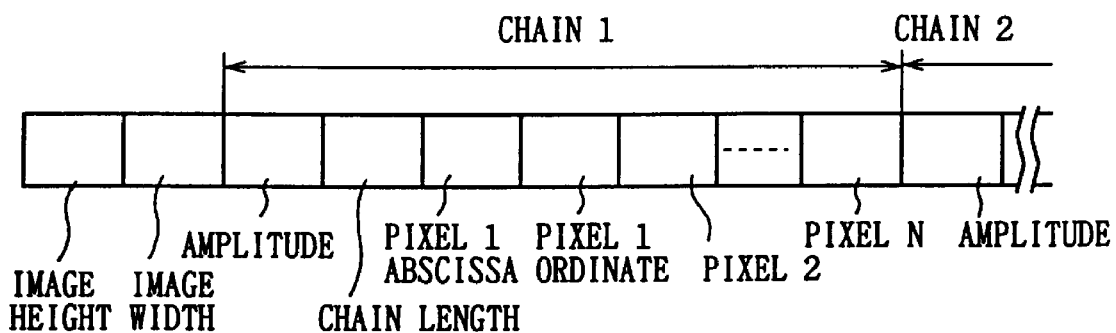
FIG. 5 is a schematic diagram showing bitstream syntax of the edge information component coded in the edge information detection and coding processing unit of FIG. 4.

When the most relevant edge is selected, position information of those edges are coded along with their amplitude at the contour coding unit 3D and send to the decoding side. From a human visual characteristic, amplitude of an edge is generally less important than its position. Furthermore, luminance of the video signal does not change significantly along with its edge. Therefore, the same amplitude is allotted to all pixels belonging to the same contour. Here, the amplitude is the average value of amplitude of all pixels in the contour. The position of the contour is coded using a chain coding algorithm. Actually, the structure of the bit stream for coding the edge information is as shown in FIG. 5; next to height and width of an image, each contour starts by a prefixed number of bits defining the amplitude of all pixels, followed by the length of the chain.

Figure 6:
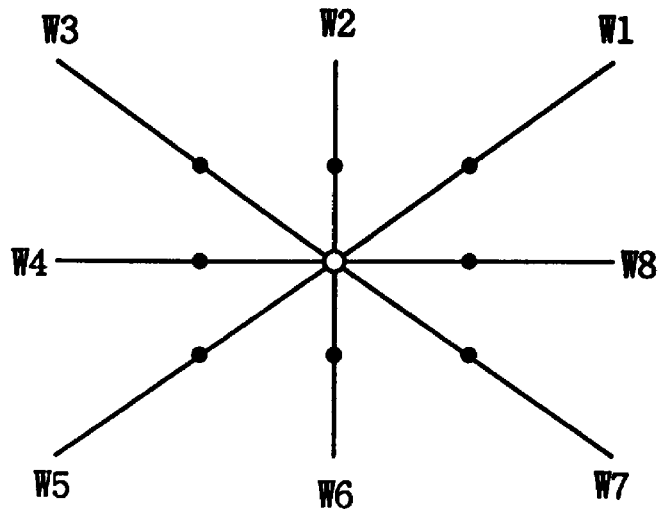
FIG. 6 is a schematic diagram explaining chain coding information of the pixels when coding in the edge information detection and coding processing unit of FIG. 4.

Further, in each chain, the coordinates of the first pixel in the chain are given in absolute values of vertical and horizontal axes, whereas the following pixels in the chain are coded according to their relative position to the previous pixel as shown in FIG. 6. Incidentally, in the figure, a white pixel shows the pixel coded previously, and black pixels show the pixels to be coded presently. A bit ward Wn is used to show the coordinate of new pixels to previous pixels. Since the structure of coding the edge information does not depend on the size of the image completely, reduction or enlargement of the edge information can be obtained by very simple coordinate change when decoding the bit stream. The edge information reconstruction becomes then quasi resolution depending on fractal coding technique in a similar way.

Figure 20:
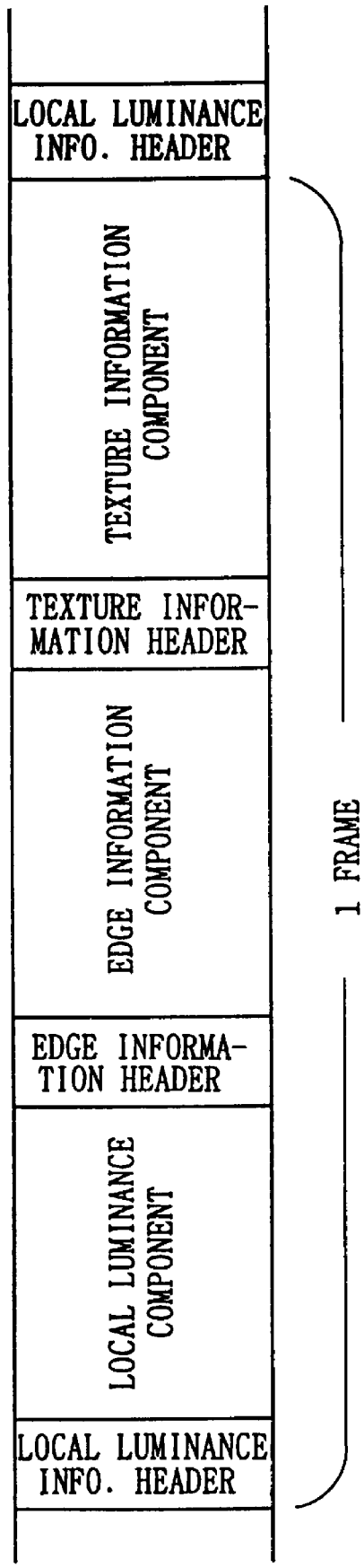
FIG. 20 is a diagram showing an embodiment of a transmission bit stream obtained by the video signal coding apparatus of FIG. 1.

The remaining information not presented in the local luminance and edge information is defined to be the texture information. Concretely, the texture information is extracted as follows. First, the edge information component S4 being coded edge information is decoded in the edge information decoding and reconstruction processing unit 4. Further, the edge information decoding and reconstruction processing unit 4 reconstructs the local decoded image from this decoded edge information and the local luminance supplied from the low pass filter 2A by using the diffusion process. "S. Carlsson. Sketch based coding of gray level images. Signal Processing, 15(1):57–83, 1988", etc., states about the diffusion process in detail. The local decoded image obtained here is similar to the input image S1 to a certain degree. Succeedingly, the subtraction processing unit 5 obtains difference between the input image S1 and the local decoded image, which becomes the texture information. Typical texture regions in the image belongs to the texture information, but also non-detected edges of less relevant contours may be sent through this texture information. Any classical technique can be used to code the texture information in the texture information coding unit 6. The texture information coded in the texture information coding unit 6 is output as the texture information component S7. Because of its smaller perceptual importance, higher compression can be achieved for the texture information. In a case where a coding method with multiresolution data structure is used to code the texture information, 3CC will have a multiresolution characteristic since the local luminance and edge information are actually resolution independent. In a multiplexer circuit which is not shown, headers for discriminating respective components are added to the local luminance component S2, the edge information component S4, and the texture information component S7 which are obtained in this manner for one frame, and the components are multiplexed. And then, the components are transmitted as, for example, the bit steam shown in FIG. 20. Incidentally, details of the edge information component part in FIG. 20 is shown in FIG. 5 as described above.

Figure 7:
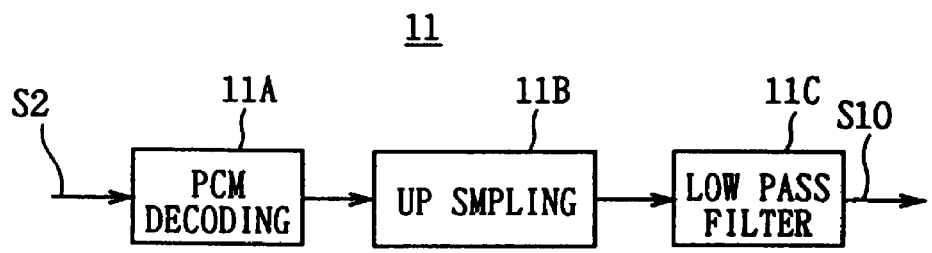
FIG. 7 is a block diagram showing a local luminance decoding and reconstruction processing unit in the video signal decoding apparatus of FIG. 2.

Next, as shown in FIG. 7, the local luminance decoding and reconstruction processing unit 11 of the video signal decoding apparatus 10 is composed of a PCM decoding unit 11A, an upsampling unit 11B, and a low pass filter 11C. The local luminance component S2, the edge information component S4, and the texture information component S7 which are separated from the transmission bit stream by a separation circuit not shown are supplied to the video signal decoding apparatus 10. Virtually, the local luminance component S2 is decoded by the PCM decoding unit 11A, and is input to the upsampling unit 11B. This processing of the upsampling unit 11B is equivalent to a zoom of the subsampled luminance information. The zoom factor, e.g., up sampling factor is equal to the down sampling factor at the encoding side. However, it is possible to transform to the luminance signal having a different resolution, for arbitrary resolution by changing the up-conversion parameters composed of the characteristic of the succeeding low pass filter 11C and the upsampling factor. The luminance component is therefore quasi-independent to the resolution of the original image in a certain sense.

Figure 8:
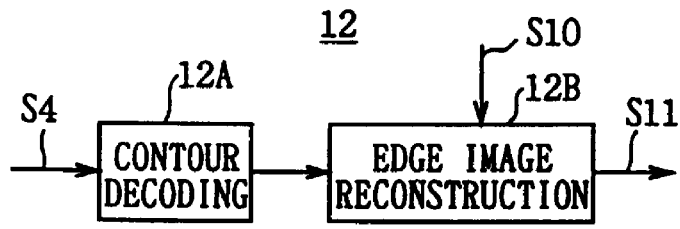
FIG. 8 is a block diagram showing an edge information decoding and reconstruction processing unit in the video signal decoding apparatus of FIG. 2.

The edge information decoding and reconstruction processing unit 12 is constructed as shown in FIG. 8. First, the edge component S4 is supplied to a contour decoding unit 12A where releases chain coding. Succeedingly, an edge image reconstruction unit 12B restores an edge image S11 by using the decoded edge information and the reconstructed local luminance S10. As described above, the reconstruction of the edge information depends on the technique to extracting the edge information. In this technique, a diffusion process is used similar to the coding side of the edge information decoding and reconstruction processing unit 4 to restore the edge image using the local luminance, the contour position, and the amplitudes. The edge image corresponds to the decoding side of local decoded image. Similar to the local luminance information, the edge information can be decoded by simple coordinate change and desired resolution. Further, the texture information component S7 is supplied to the texture information decoding unit 13 where this component is decoded corresponding to the texture information coding unit 6, and then is output as decoded texture information S12. The edge image S11 and the decoded texture information S12 are added in the addition processing unit 14, and a reconstructed image S13 can be obtained.

Figure 9:
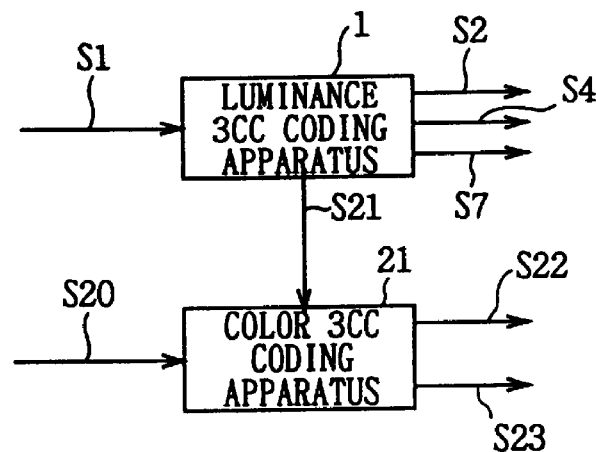
FIG. 9 is a block diagram explaining the brief construction of a chrominance video signal coding apparatus according to the present invention.

The coding and decoding of the video signal by 3CC described above is mentioned about the luminance signal, and the processing of the chrominance signal is similar to that of the brightness signal except for the following point. More specifically, as shown in FIG. 9, a chrominance video signal coding apparatus 20 by 3CC is constructed by a combination of a luminance 3CC coding apparatus 1 and a chrominance 3CC coding apparatus 21. Because of the high correlation between the brightness signal S1 and the chrominance signal S20, their edge position information is assumed to be similar.

Therefore there does not need to send a special chain coding information for the chrominance signal S20. However, the amplitude of the chrominance signals for every chain is calculated and sent to the video signal decoding apparatus. In addition, in the case of color image format where the chrominance signals have a lower resolution, a coordinate change is performed to decode the edge information S21 of the luminance signal at the resolution of the chrominance signal S20.

Figure 21:
FIG. 21 shows simulations by 3CC.
Figure 21:
Figure 21:
Figure 21:
Figure 21:
Figure 21:

The processing of the video signal coding apparatus 1 by 3CC as described above is shown in FIGS. 21 and 22 by giving typical images as examples. FIG. 21 shows the original video signal S1 (FIG. 21(A)), the reconstructed local luminance component S2 (FIG. 21(B)), the edge information (FIG. 21(C)), the edge information after post-processing S4 (FIG. 21(D)), the reconstructed edge image S5 (FIG. 21(E)), and the texture component S7 (FIG. 21(F)), respectively. In the images, white represents a high energy portion and black represents a low energy portion.

Further, FIG. 22 shows the texture component by comparing the coded results by 3CC using JPEG algorithm to that of the JPEG algorithm to code the entire image. The simulations were carried on the same image with similar compression rates equal to 12:1. FIG. 22 shows the decoded image by 3CC (FIG. 22(A)), the decoded image by JPEG (FIG. 22(B)), an image in which the shoulder area of the decoded image by 3CC is enlarged (FIG. 22(C)), an image in which the shoulder area of the decoded image by JPEG is enlarged (FIG. 22(D)), an error image of the decoded image by 3CC (FIG. 22(E)), an error image of the decoded image by JPEG (FIG. 22(F)), respectively. In the images, white represents a high energy portion and black represents a low energy portion.

As shown in the enlarged area of the shoulder in the test image, the quality of the image in the case of 3CC is superior around contour areas. An observation of the energy of the error of reconstruction in both techniques shows that the error of reconstruction is concentrated at the top of the contour areas and remains imperceptible. The latter is more spread in the case of JPEG algorithm, and lead to annoying by-products, particularly, in the case of moving video images.

According to the construction described above, the video signal is decomposed into the local luminance information composed of the smooth component, the edge information composed of the contour component, and the texture information composed of the component except for the smooth and contour component. Then, the local luminance information is coded by the coding method in which this information is all stored; the edge information is coded by the coding method with chain information and constant amplitude information; and the texture information is coded by the coding method having higher compression rate compared with the local luminance information and the edge information. Therefore, the visual quality of the restored image can be improved with higher compression rate than ever.

(3) Edge Detection Processing

Here, the description will be given about processing method for the edge detection from the video signal in the edge detection and coding processing unit 3 and image reconstruction method from the edge information. Signal discontinuities of the video signal and so on represent a very important feature of natural and synthetic signals, and an important portion of the information carried by them is residing in their singular points. Several works have been reported in order to represent signals from their singularities.

In particular, signal representations from zero-crossings or maximum value, e.g., edge detection have been studied in details (R. Hummel and R. Moniot. Reconstructions from zero crossings in scale space. IEEE Trans. on ASSP, 37(12):2111–2130, 1989, S. G. Mallat. Zero-crossings of a wavelet transform. IEEE Trans. on Information Theory, 37(4):1019–1033, 1991, S. G. Mallat and S. Zhong. Characterization of signals from multiscale edges. IEEE Trans. on PAMI, 14(7):710–732, 1992, S. G. Mallat and S. Zhong. Singularity detection and processing with wavelets. IEEE Trans. on Information Theory, 38(2):617–643, 1992).

In the case of images, studies of the human visual system show that the edge information which represents singular points is a very important construction component in feature extraction and image understanding. (D. Marr. Vision. W. H. Freeman and Company, New York, 1983, M. Kunt, A. Ikonomopoulos, and M. Kocher. Second generation image coding techniques. Proceedings of the IEEE, 73(4):549–575, April 1985, M. Kunt, M. Bernard, and R. Leonardi. Recent results in high compression image coding. IEEE Trans. on Circuits and Systems, 34(11):1306–1336, November 1987). Moreover, the reconstruction of a signal from its singularities is very helpful in several applications such as coding, computer vision, signal analysis, and so on.

Figure 10:
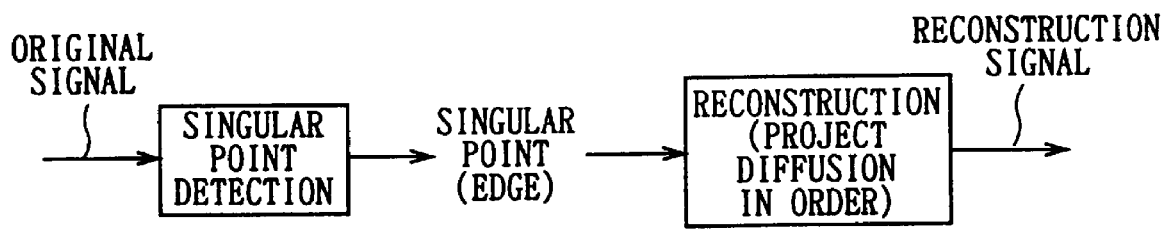
FIG. 10 is a block diagram explaining a reconstruction signal resulted from a singular point detection as an edge detection.

FIG. 10 shows the singular point detection processing and the reconstruction processing to obtain a good approximation of the same signal by decomposing a signal into its singular points, using only the singular points. The object of the first block in this diagram is to extract the singular points. In general, first and second differential component are used for this edge detection apparatus. The problem of edge detection has also been investigated and several edge detection apparatuses have been proposed (J. F. Canny. A computational approach to edge detection. IEEE Trans. on PAMI, 8(6):679–698, November 1986., D. Marr and E. C. Hildreth. Theory of edge detection. In Proc. Roy. Soc. London B, volume 207, pages 187–217, 1980).

The Canny and the Marr-Hildreth edge detection apparatuses are among the most popular ones which make use of first and second differentials, respectively. The majority of the other edge detection apparatuses are variants of these two techniques. However, the above techniques have been designated to optimize the detection problem under conditions related to feature extraction only, without considering the problem of signal reconstruction from the singularities.

Figure 11A:
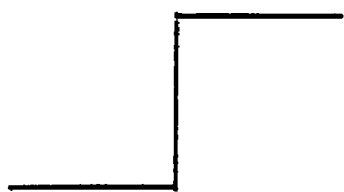
FIGS. 11(A) to 11(E) are schematic diagrams explaining the edges having same discontinuity which causes an erroneous detection when the edge detection.
Figure 11B:
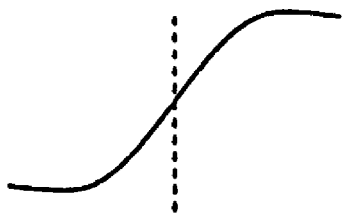
Figure 11C:
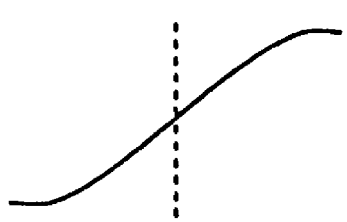
Figure 11D:
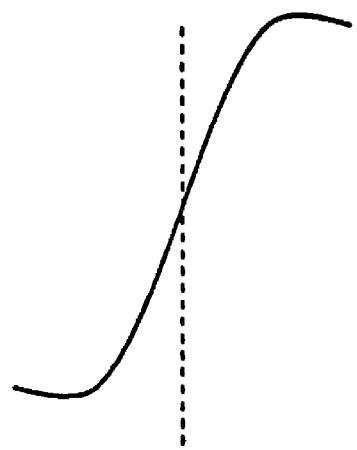
Figure 11E:
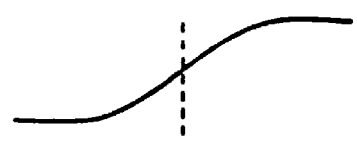

For example, an assumption of the various types of edges shown in FIGS. 11(A), (B), (C), (D), and (E) is made. Incidentally, in FIG. 11, figures are assumed as the edge of sharp edge (FIG. 11(A)), a smooth edge (FIG. 11(B)), a very smooth edge (FIG. 11(C)), a high contrast (FIG. 11(D)), a low contrast (FIG. 11(E)). Conventional edge detection methods find the position of all these edges to be the same. Therefore, the simple position information is not enough to characterize the discontinuities. This embodiment represents a new edge detection method for edge detection more suitable for signal reconstruction.

The second block in FIG. 10 shows the reconstruction processing unit from the singular points. Several approaches have been proposed with regard to this reconstruction, each depending on the method used for the singularity detection (S. G. Mallat and S. Zhong. Characterization of signals from multiscale edges. IEEE Trans. on PAMI, 14(7):710–732, 1992, S. G. Mallat and S. Zhong. Singularity detection and processing with wavelets. IEEE Trans. on Information Theory, 38(2):617–643, 1992, S. Carlsson. Sketch based coding of gray level images. Signal Processing, 15(1):57–83, 1988). This embodiment uses the technique proposed in S. Carlsson. Sketch based coding of gray level images. Signal Processing, 15(1):57–83, 1988, for the reconstruction of the signal from its singularities which makes use of a diffusion process. This method is very efficient in computational complexity when compared to the other methods.

Figure 12A:
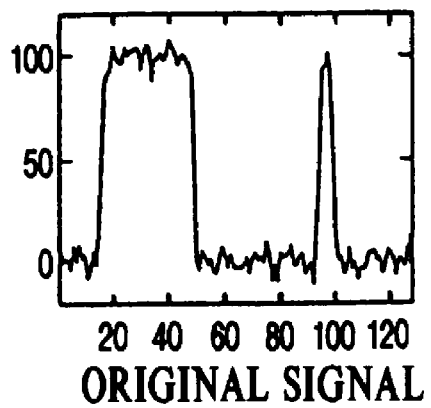
FIGS. 12(A) to 12(D) are signal waveform diagrams explaining operation of detecting a singular point to the discontinuity which is typical of the edge detection.

Here, the description will be made about the main parts of the new edge detection method. For simplicity of the description, the description is limited to one-dimensional signal (1-D signal). It is however possible to generalize the same reasoning into n-dimensional signal (n-D signal) case with n>1. In next section, examples of two-dimensional signal (2-D signal) case will be given for more clarity. For a better understanding of this edge detection method, the results of the procedure which is applied to a step edge including noise is given after every stage by using FIGS. 12(A), (B), (C), and (D). Incidentally, each figure shows the original signal (FIG. 12(A)), the absolute value signal of the first differential (FIG. 12(B)), the signal of the second differential (FIG. 12(C)), and the signal showing the dominant point of this embodiment (FIG. 12(D)).

Figure 12B:
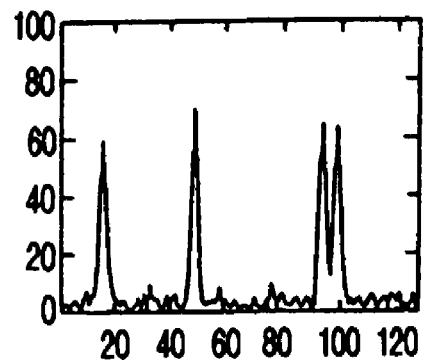
Figure 12C:
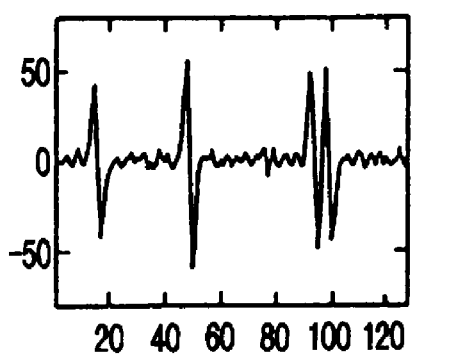
Figure 12D:
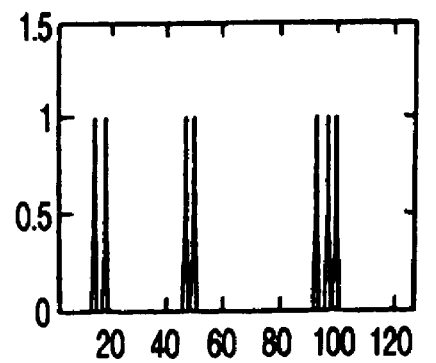

As described above, the ultimate purpose of this technique is to detect extra points in signals (in this embodiment, referred to as dominant points) in order to characterize its singularities as precisely as possible, from a signal reconstruction point of view. In the case of the first differential based techniques, the edge points correspond to local maximum value of the first differential as shown in FIG. 12(B), whereas in the case of the second differential techniques, the edge points are located at the zero crossings of the second differential as shown in FIG. 12(C).

Although these methods can correctly find the position of the discontinuities, they fail to completely describe the nature of its discontinuity such as the degree of the sharpness. For this purpose, other points (that is, the dominant points) shown in FIG. 12(D) may be more appropriate. The dominant point proposed by this embodiment can be used in order to define a summary of the signal around the discontinuities (for instance, by a simple linear interpolation), whereas this is impossible in the case of the singular points detected by conventional edge detection apparatuses using the first differential and the second differential.

Figure 13:
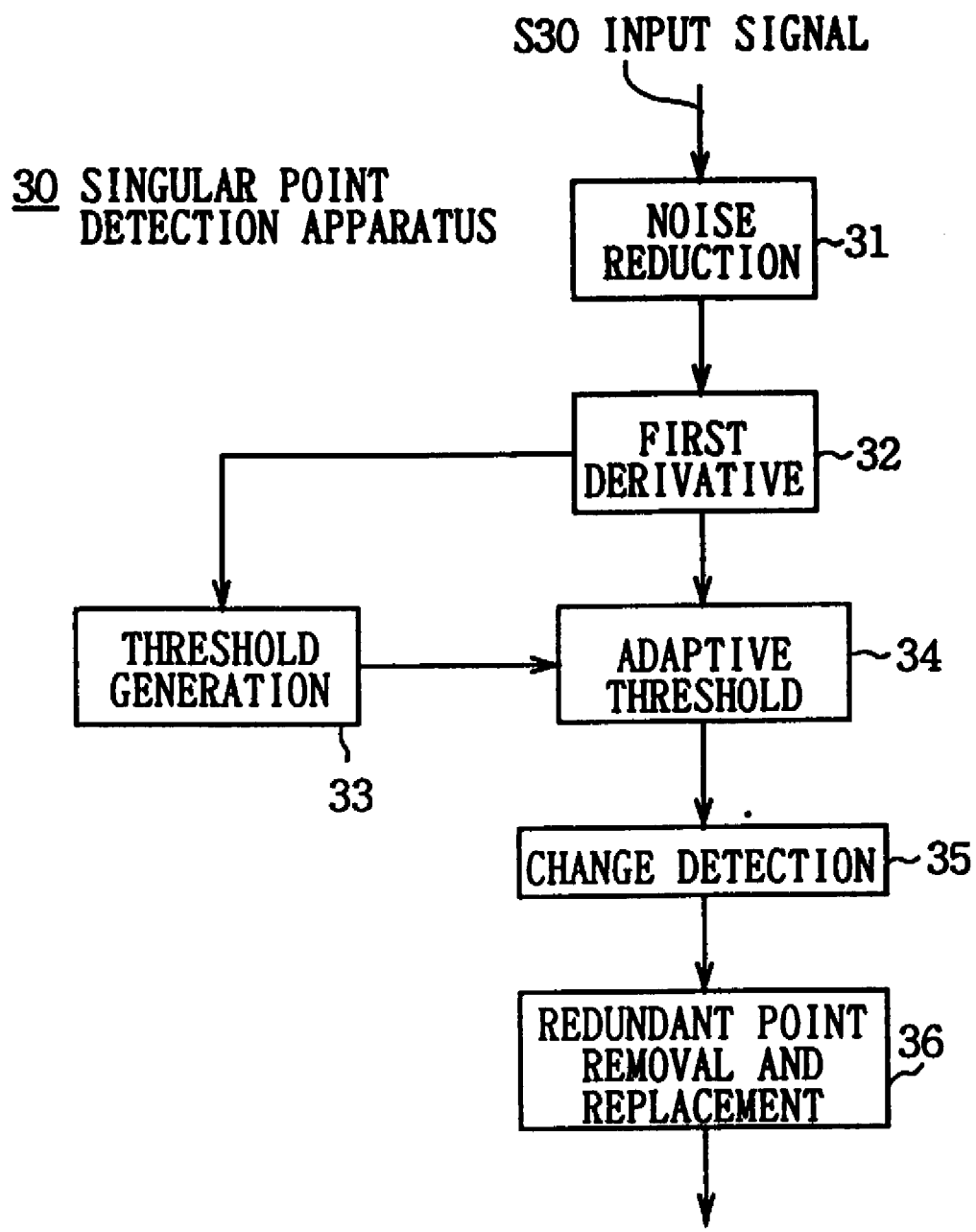
FIG. 13 is a block diagram showing an embodiment of a singular point detecting apparatus as the edge detecting apparatus.
Figure 14A:
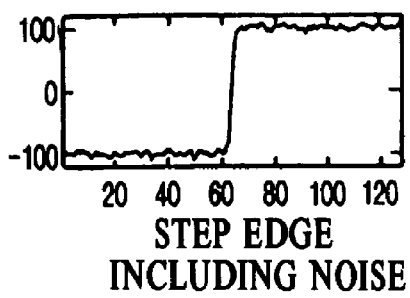
FIGS. 14(A) to 14(F) are signal waveform diagrams explaining the operation of detecting the singular point and reconstruction at the step edge including noise.

FIG. 13 shows the construction of a singularity detection apparatus 30 of this embodiment, which is composed of a noise reduction processing unit 31, a first differential operating unit 32, a threshold generation processing unit 33, an adoptive threshold processing unit 34, a change detection processing unit 35, and a redundant points removal and replacement processing unit 36. FIGS. 14(A), (B), (C), (D), (E), and (F) show the case where this singular point detection technique is applied to the original signal composed of step edge including noise. Each figure shows the step edge including noise in the original signal (FIG. 14(A)), the signal smoothed by using a Gaussian-like low pass filter (FIG. 14(B)), gradient function and the value of the adaptive threshold (FIG. 14(C)), candidate points as singularities (FIG. 14(D)), the dominant points obtained by the algorithm of this embodiment (FIG. 14(E)), and result of a reconstruction after repeating a hundred times of diffusion processes using the dominant points (FIG. 14(F)). Actually, the noise reduction processing unit 31 improves the quality of the detection based on the first derivative. Here, a Gaussian-like low pass filter is used in order to reduce the influence of noise to the first derivative processing in the first derivative processing unit 32.

Figure 14B:
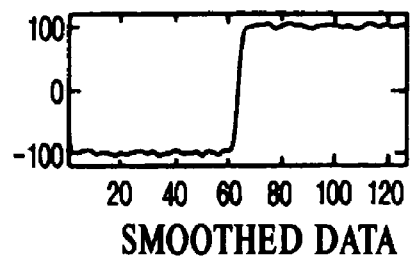

The degree of the intense of the low pass filter depends on the amount of noise present in the original data. At this stage, other noise reduction operators can also be used, such as median or morphological filters. Here, FIG. 14(B) shows the result of this stage on the step edge of the original signal including noise shown in FIG. 14(A). In this example, the kernel (0.25 0.5 0.25) was used as the low pass filter.

Then, the first derivative processing unit 32 is applied to the result of the noise reduction processing unit 31 at the first stage. All kernel approximating a first derivative can be used at this stage. In the procedure to be described here, a symmetrical kernel (−1 0+1) is used in order to prevent the drift in the position detection of the discontinuities. The result of the two first stages is equivalent to a gradient detection.

In order to correctly extract the dominant points from noise, a threshold is applied in the threshold generation processing unit 33. The value of the threshold is dependent on the amount of noise present in the gradient, as well as the local amplitude of the gradient. An adaptive thresholding method is therefore used to correctly select the value of the threshold based on the local behavior of the signal. Further, as described above, the value of the threshold depends on two parameters in the adaptive threshold processing unit 34: the noise present in the signal, and the local amplitude of the gradient.

Actually, at each point, the following equation:

$$\theta(k) = \max(a(k), \epsilon) \qquad (1)$$

is used to decide the value of the threshold. Here, the operator max(,) is a maximum operator defined as the following equation:

$$\max(a,b) = \begin{cases} a & \text{if } a > b \\ b & \text{otherwise} \end{cases} \qquad (2)$$

Figure 14C:
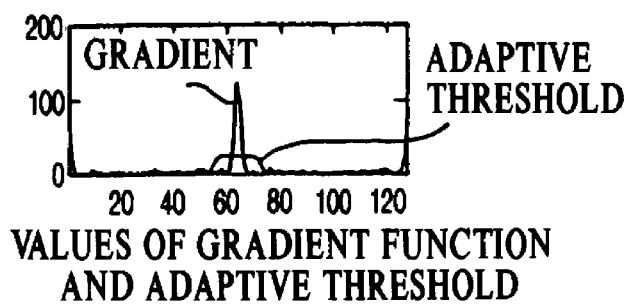

Incidentally, in the equation (1), $a(k)$ is the result of an average filtering operation on the absolute value of the gradient of the signal, with a kernel given by ($a_{-w}$, $a_{-w+1} \ldots a_o \ldots a_{w-1}$, $a_w$). And $\epsilon$ is the minimum value of the threshold which depends on the amount of noise present in the data. FIG. 14(C) shows the gradient as well as the adaptive threshold using the equation (1). The value of w in this simulation is selected to be equal to 8 and all the values of the coefficients inside the kernel are put to $1/(2_w+1)$. The value of $\epsilon$ is equal to 10 in this simulation.

Figure 15A:
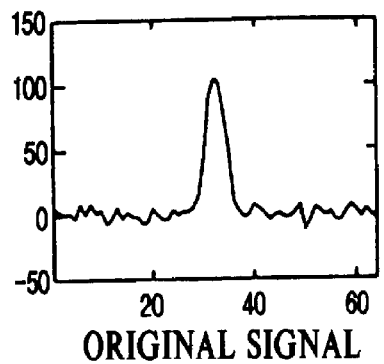
FIGS. 15(A) to 15(D) are signal waveform diagrams explaining the importance of adaptive threshold for detecting the singular point.
Figure 15B:
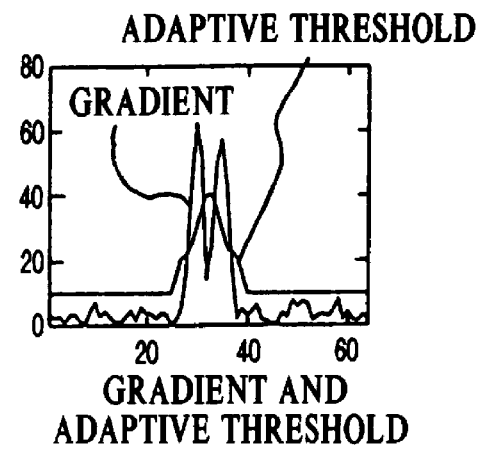
Figure 15C:
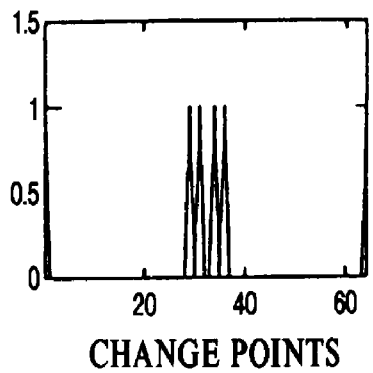
Figure 15D:
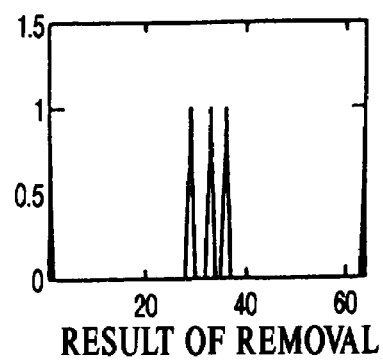

Here, the description points out the importance of an adaptive thresholding when characterizing sharp and localized transition by using FIGS. 15(A), (B), (C), and (D). Each figure shows the original signal (FIG. 15(A)), gradient and adaptive threshold (FIG. 15(B)), change points (FIG. 15(C)), and the dominant points after removal and replacement of redundant points (FIG. 15(D)). If a constant threshold is selected, in the case of a high threshold (for example, a threshold is constantly set to 40 in FIG. 15(B)), some of the important points to characterize the signal will not be detected (i.e., the maximum point of the transition is not detected for its smaller value than 40), whereas in the case of a too small threshold (for example, a threshold is constantly set to 10 in FIG. 15(B)), the position of the characteristic points is not accurate anymore because all points of the sharp transition part exceed the set value.

Figure 17A:
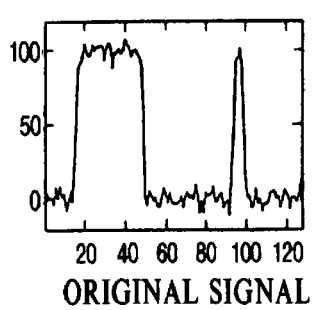
FIGS. 17(A) to 17(D) are signal waveform diagrams explaining the operation of detecting the singular point at the step edge including noise.
Figure 17B:
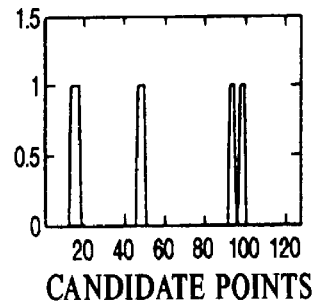

In the detection of the dominant points according to this embodiment, all samples with a gradient value above the threshold are considered as candidates to characterize the discontinuity. Although these points can characterize discontinuities in the data, there still exist a certain redundancies among them. The purpose of the following processings is to extract a sample which is considered to be able to characterize discontinuities with an enough good approximation as the dominant point. All other candidates are then discarded. This stage can be divided into the change detection processing unit 35 and the redundant points removal and replacement processing unit 36. Incidentally, FIGS. 17(A), (B), (C), and (D) show the operation of the singularity detection applied to a step edge including noise: each of them show the original signal (FIG. 17(A)), the candidate point (FIG. 17(B)), the result of the change detection (FIG. 17(C)), and the result of the removal and replacement of the redundant point (FIG. 17(D)).

Figure 17C:
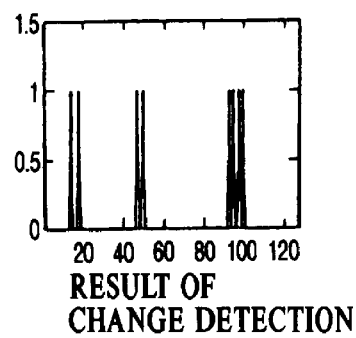

First, in the change detection processing unit 35, if neighbors of a candidate point are other candidate points, the candidate point is removed because of the judgment which that candidate is not a change point. In this state, sharp discontinuities are detected as two consecutive step edges. FIG. 17(C) shows an example of the result. Next, in the redundant point removal and replacement processing unit 36, it is possible to improve the quality of the dominant point detection while reducing their number under the situation described above, using the following simple procedure.

Figure 17D:
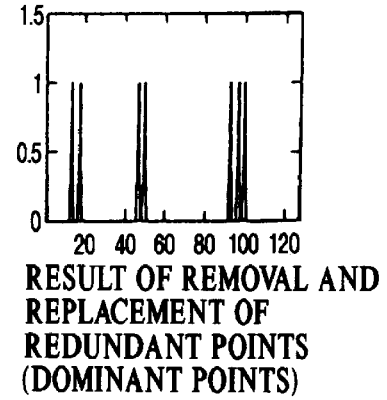

The resulting candidate points after change detection are examined using a sliding window of size D. If there are at least two candidate points inside the window, respective amplitudes of two candidate points on the original signal are compared. In the case where their difference does not exceed a certain threshold T, both candidates are removed and a new candidate point is created at the middle distance between two previous candidates. A result of dominant point detection is shown in FIG. 17(D). The threshold value in this example is selected to be T=10 and the size of the sliding window is D=4.

Figure 16:
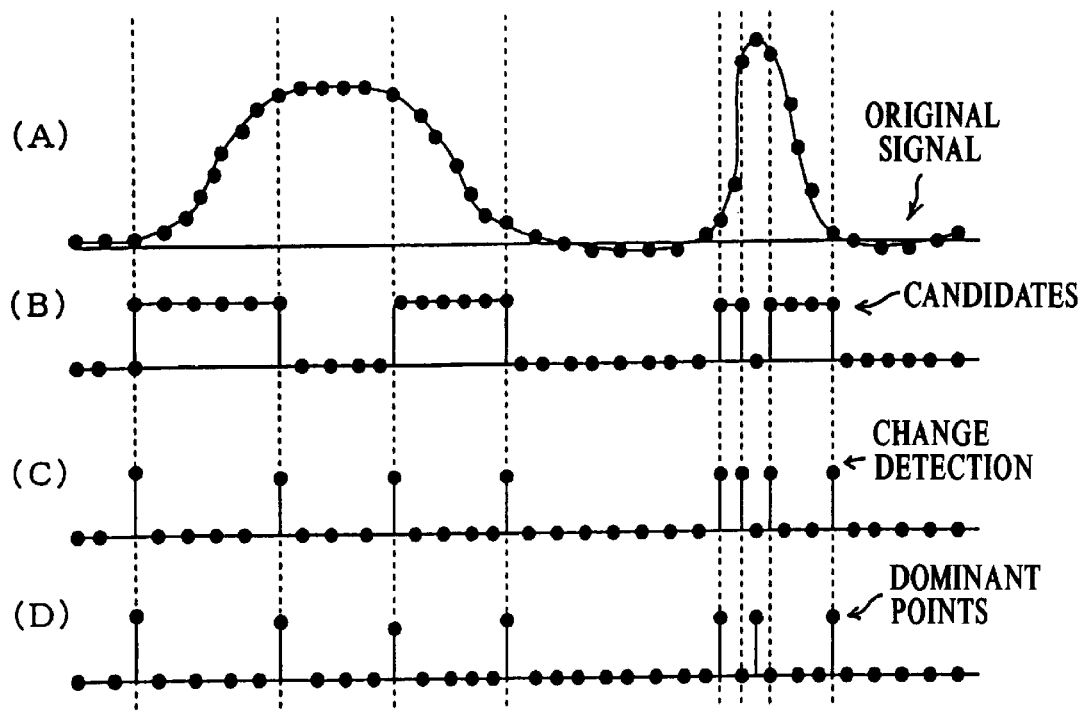
FIGS. 16(A) to 16(D) are signal waveform diagrams explaining detection of the change for detecting the singular point and deletion and replacement of a redundant point.

FIG. 16 shows an example of the case of the aforementioned processing by sample level. If the original signal is the signal shown in FIG. 16(A), the adaptive threshold processing unit 34 extracts samples shown in the upper side of FIG. 16(B) as the candidate points. Next, the change detection processing unit 35 removes the redundant point from the detected change point by replacement, and then detects samples shown in the upper side of FIG. 16(D) as the dominant points. The samples of the original signal corresponding to the positions of the dominant points is considered as the singular points, and the position information of the singular points and their amplitudes are chain-coded in the contour coding unit 3D shown in FIG. 4.

Figure 14D:
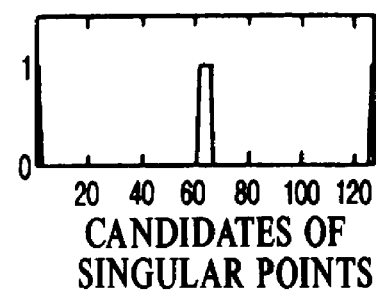
Figure 14E:
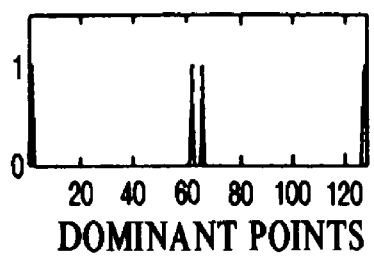
Figure 14F:
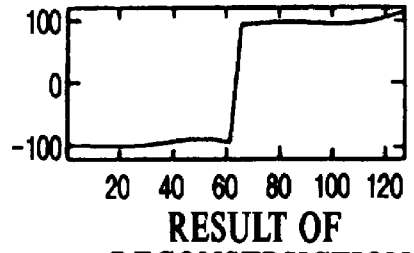
Figure 18A:
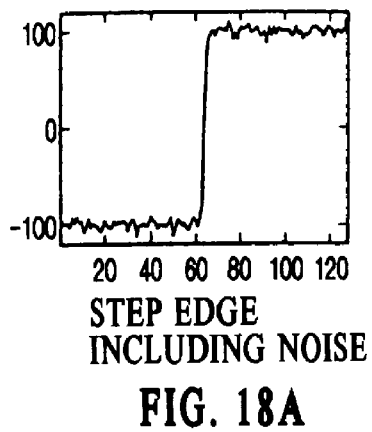
FIGS. 18(A) to 18(D) are signal waveform diagrams explaining the operation of detecting the singular point and reconstruction by the conventional Canny method at the step edge including noise.
Figure 18B:
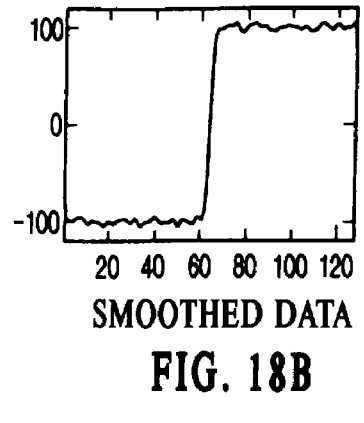
Figure 18C:
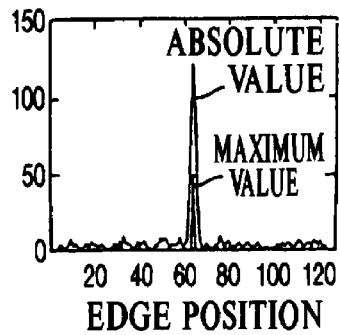
Figure 18D:
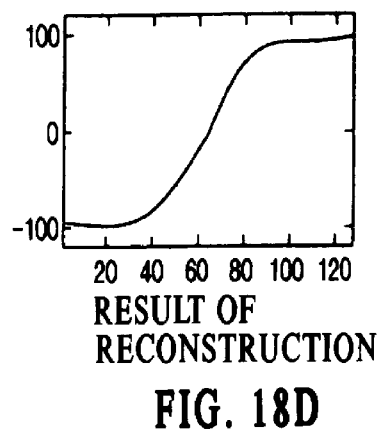

Here, the description will be made about a comparison between the performances of the proposed edge detection apparatus and a conventional edge detection apparatus. FIGS. 18(A), (B), (C), and (D) show the signal reconstruction using singularities detected by a Canny-like singular point detection which is applied to the step edge including noise as a comparison: each of the figures show the step edge including noise (FIG. 18(A)), the smoothed signal using a Gaussian-like low pass filter (FIG. 18(B)), the absolute value of the first derivative and the edge position as its minimum (FIG. 18(C)), and the result of a reconstruction after repeating a hundred times of diffusion processes using the edge positions (FIG. 18(D)). A comparison between the results of this simulation of FIG. 18(D) and that of FIG. 14(D) shows that FIG. 14(D) has the shape more approximate to the original signal, so that this edge detection apparatus outperforms significantly the more conventional apparatus, when the purpose is to reconstruct the signal from discontinuities.

Figure 19:
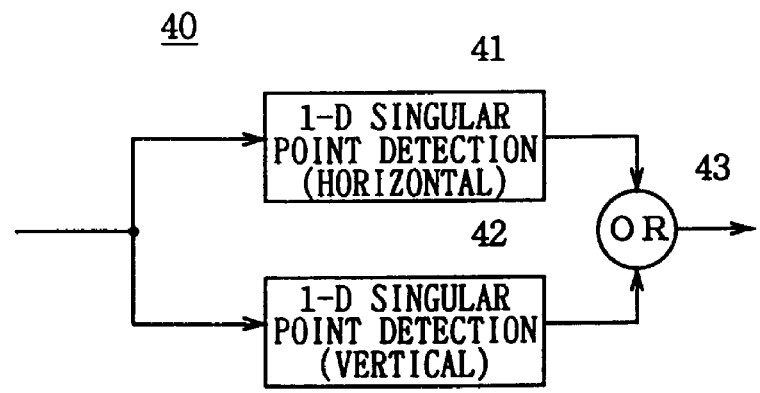
FIG. 19 is a block diagram showing the construction of 2-D edge detecting apparatus which is applied a method for detecting the singular point.

Here, FIG. 19 shows a 2-D edge detection apparatus 40 in which aforementioned singular point detection and reconstruction is extended into 2-D signal. More specifically, this 2-D edge detection apparatus 40 is constructed by applying two separate 1-D singular point detection procedures along the two axes. Each subblock of this 2-D edge detection apparatus 40 represents the same structure as aforementioned singular point detection apparatus of FIG. 13. Two singular point detection apparatuses 41 and 42 are therefore applied to the 2-D signal in the horizontal and vertical directions independently. The output of every branch is a binary signal equal to one at the singular points. The final result can be obtained from the OR sum of the two branches by an OR circuit 43.

Figure 23:
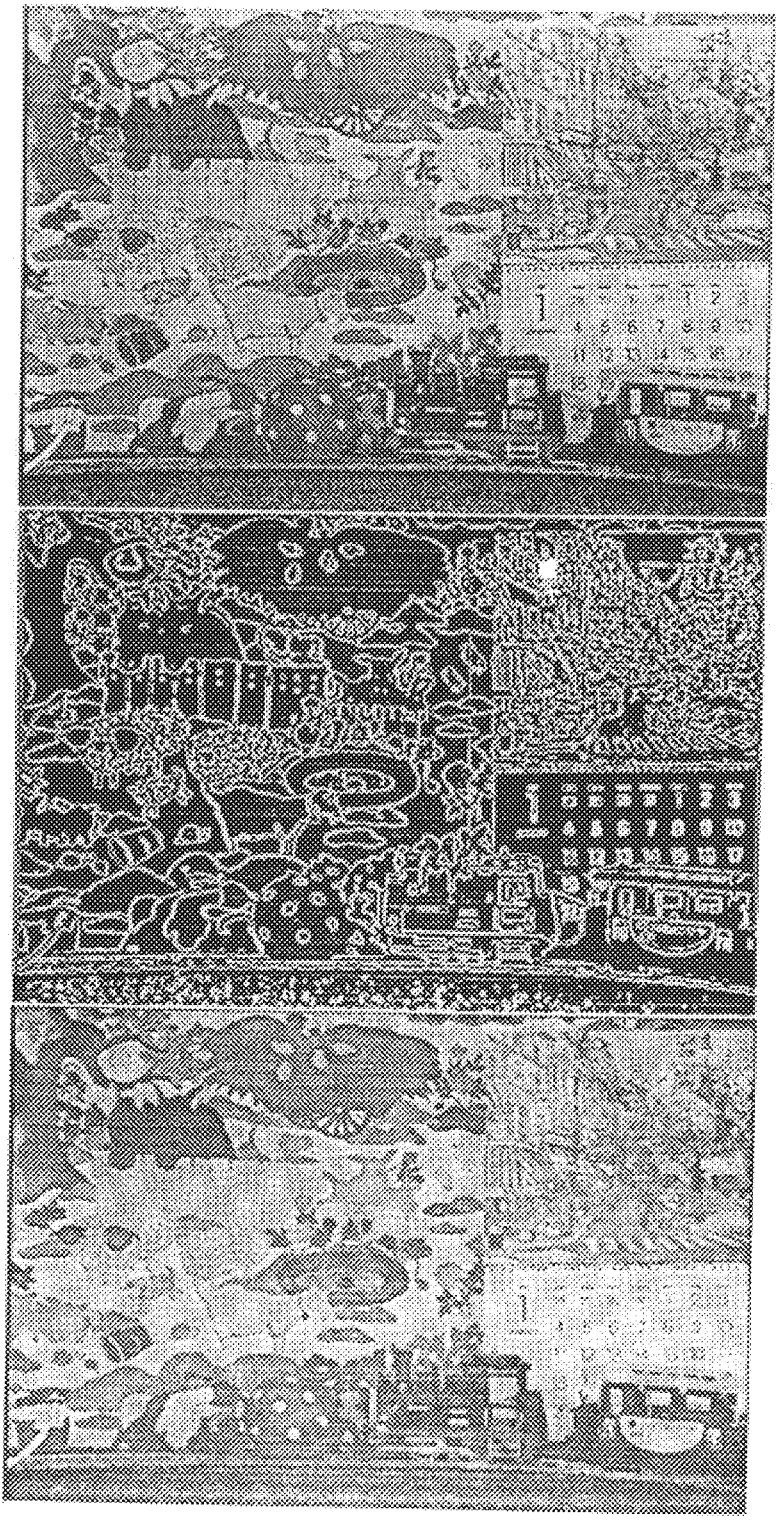
FIG. 23 shows the detection of the singular point and the reconstruction according to the embodiment.
Figure 24:
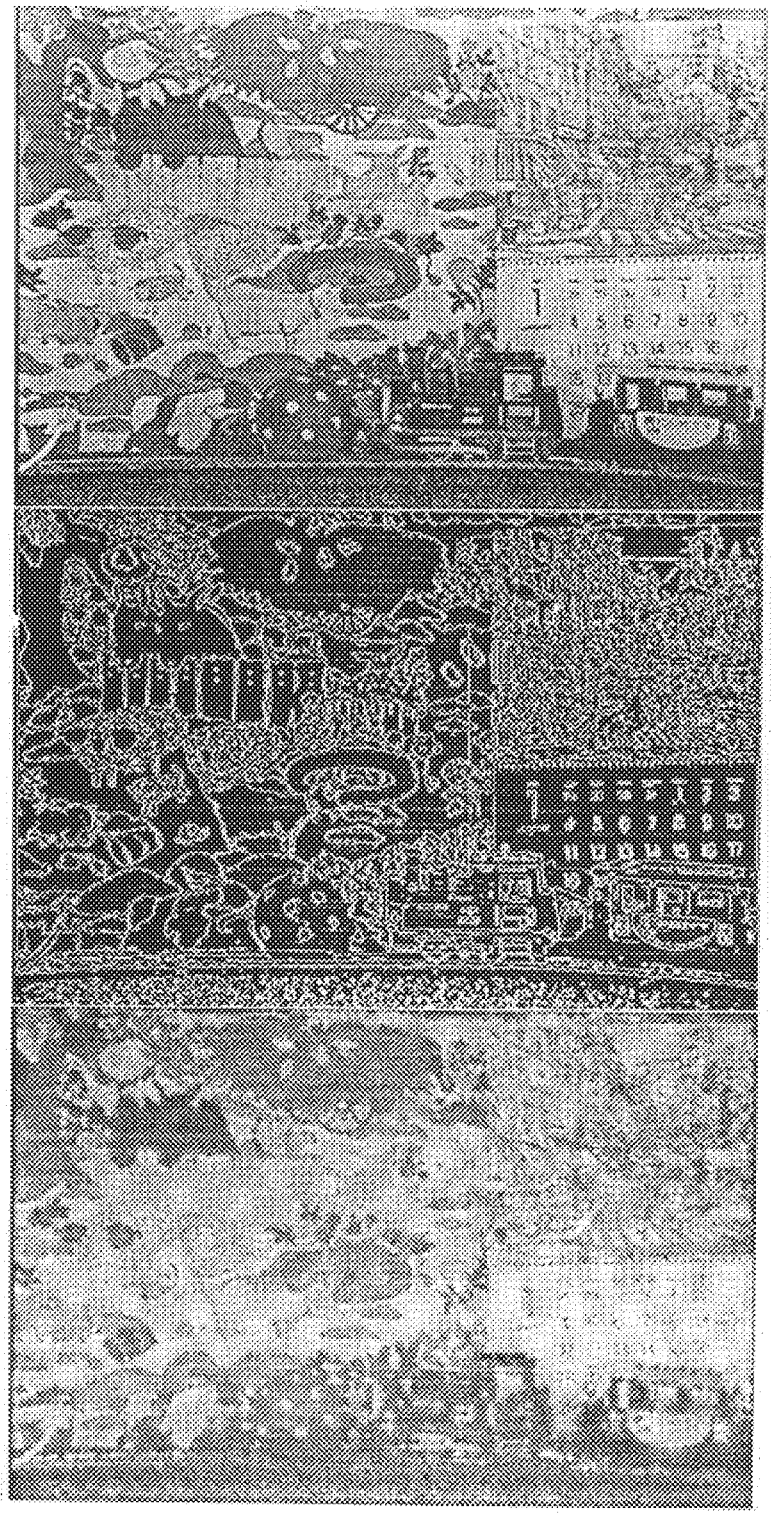
FIG. 24 shows the detection of singular point and the reconstruction by canny edge detection.

FIG. 23 shows test images used for this simulation, as well as the result of the 2-D version of the new technique described in the foregoing section. The reconstructed image is obtained by using the diffusion process. The value of all the parameters are the same as those in the simulation of FIG. 14. For comparison, the same simulation is also carried, two times using Canny edge detection apparatus (same values of the parameters). The result of the reconstructed signal is shown in FIG. 24. As it can be seen, this edge detection technique represents a performance for superior than that of Canny edge detection apparatus from a signal reconstruction point of view.

Further, FIG. 23 shows the result of reconstruction of the image from singular points obtained by the singular point detection apparatus for a gray scale image: each of them show the original image (FIG. 23(A)), singular points obtained by new edge detection apparatus (FIG. 23(B)), and reconstructed data from the singular points and their respective amplitudes on the original image after repeating a diffusion process for thirty times (FIG. 23(C)).

Further, FIG. 24 shows the result of reconstruction of the image from singular points obtained by the Canny edge detection apparatus for a gray scale image: each of them show the original image.(FIG. 24(A)), singular points obtained by the Canny edge detection apparatus (FIG. 24(B)), and reconstructed data from the singular points and their respective amplitudes on the original image after repeating a diffusion process for thirty times (FIG. 24(C)).

As described above, according to the present invention, the video signal is resolved into the local luminance information, the edge information composed of the contour component, and the texture information composed of components other than the smooth component and the contour component. Then, the coding of the local luminance information is performed by a coding method in which the above information is stored. The coding of the edge information is performed by a coding method based on the chain information and the constant amplitude information, and the coding of the texture information is performed by a coding method having a higher compressing ratio than the local luminance information and the edge information, thereafter the decoding is performed. Thereby, the method for coding a video signal and the apparatus thereof in which the coding can be performed with higher compression rate than ever and in consideration of the visual picture quality of the restored image can be realized.

Further, the coded local luminance information is reconstructed to generate the reconstruction local luminance, the coded edge information is decoded to generate an edge image based on the reconstruction local luminance, and the coded texture information is decoded, and the edge image is added to the decoded texture information to generate a reconstruction image, the edge image is generated based on the reconstruction local luminance and the reconstruction edge information are added to the decoded texture information to reconstruct the original image, so that the image signal decoding apparatus in which the coded data can be surely decoded in consideration of visual picture quality of the restored image.

Industrial Applicability

The video signal coding method and apparatus thereof, and the video signal decoding method and apparatus thereof can be utilized to television telephone systems and television conference systems, etc., which is required the transmission by low bit rate comparatively.

I claim:

1. A method for coding an input video signal defining video information that includes local luminance information, luminance edge information and texture information, said method comprising the steps of:

generating a first coded signal by coding said local luminance information that includes a smooth component of said input video signal;

generating a second coded signal by chain coding said luminance edge information that includes a contour component of said input video signal; and generating a third coded signal by coding said texture information that includes a component of said input video signal other than said smooth and contour components, said third coded signal being generated as a difference between said input video signal and a local decoded image signal which is based on said local luminance information and said second coded signal after said second coded signal has been locally decoded.

2. The method according to claim 1, wherein said step of generating said first coded signal includes low-pass filtering said input video signal for smoothing thereof, down-sampling the filtered video signal, quantizing the down-sampled video signal, and PCM coding the quantized video signal.

3. The method according to claim 1, wherein said input video signal includes a color difference component which is coded on a basis of said luminance edge information.

4. The method according to claim 1, wherein amplitude information in each chain of said second coded signal is represented by one value.

5. The method according to claim 1, wherein said third coded signal is coded at a higher compression rate than said first coded signal.

6. The method according to claim 1, wherein said step of generating said second coded signal includes differentiating said input video signal, generating an adaptive threshold value for comparing to the differentiated video signal, extracting from the differentiated video signal a video signal component having a value higher than said adaptive threshold value, detecting change points from the extracted video signal component, and determining singular points based on said change points such that said singular points are chain coded.

7. The method according to claim 6, wherein said step of determining includes replacing redundant points in said change points with new points.

8. Apparatus for coding an input video signal defining video information that includes local luminance information, luminance edge information and texture information, comprising:

means for generating a first coded signal by coding said local luminance information that includes a smooth component of said input video signal;

means for generating a second coded signal by chain coding said luminance edge information that includes a contour component of said input video signal; and means for generating a third coded signal by coding said texture information that includes a component of said input video signal other than said smooth and contour components, said third coded signal being generated as a difference between said input video signal and a local decoded image signal which is based on said local luminance information and said second coded signal after said second coded signal has been locally decoded.

9. Apparatus according to claim 8, wherein said means for generating said first coded signal includes a low-pass filter for smoothing said input video signal, means for down-sampling the smoothed video signal, means for quantizing the down-sampled video signal, and means for PCM coding the quantized video signal.

10. Apparatus according to claim 8, wherein said input video signal includes a color difference component which is coded on a basis of said luminance edge information.

11. Apparatus according to claim 8, wherein amplitude information in each chain of said second coded signal is represented by one value.

12. Apparatus according to claim 8, wherein said third coded signal is coded at a higher compression rate than said first coded signal.

13. Apparatus according to claim 8, wherein said means for generating said second coded signal includes means for differentiating said input video signal, means for generating an adaptive threshold value for comparing to the differentiated video signal, means for extracting from the differentiated video signal a video signal component having a value higher than said adaptive threshold value, means for detecting change points from the extracted video signal component, and means for determining singular points based on said change points such that said singular points are chain coded.

14. Apparatus according to claim 13, wherein said means for determining includes means for replacing redundant points in said change points with new points.

15. A method for decoding video information represented by a video signal including a first coded signal that has been generated by coding local luminance information that includes a smooth component of said video signal, a second coded signal that has been generated by chain coding luminance edge information that includes a contour component of said video signal, and a third coded signal that has been generated by coding texture information that includes a component of said video signal other than said smooth and contour components, said third coded signal having been generated as a difference between an input video signal and a local decoded image signal which is based on said local luminance information and said second coded signal after said second coded signal has been locally decoded, said method comprising the steps of:

decoding said first coded signal for reconstructing said local luminance information;

decoding said second coded signal for reconstructing said luminance edge information;

generating an edge image based on the reconstructed local luminance information and reconstructed luminance edge information;

decoding said third coded signal for reconstructing said texture information; and combining said edge image and the reconstructed texture information for reconstructing said video information.

16. The method according to claim 15, wherein said step of decoding said first coded signal includes PCM decoding said first coded signal, up-sampling the PCM decoded signal, and low-pass filtering the up-sampled signal.

17. Apparatus for decoding video information represented by a video signal including a first coded signal that has been generated by coding local luminance information that includes a smooth component of said video signal, a second coded signal that has been generated by chain coding luminance edge information that includes a contour component of said video signal, and a third coded signal that has been generated by coding texture information that includes a component of said video signal other than said smooth and contour components, said third coded signal having been generated as a difference between an input video signal and a local decoded image signal which is based on said local luminance information and said second coded signal after said second coded signal has been locally decoded, said apparatus comprising:

means for decoding said first coded signal for reconstructing said local luminance information;

means for decoding said second coded signal for reconstructing said luminance edge information;

means for generating an edge image based on the reconstructed local luminance information and reconstructed luminance edge information;

means for decoding said third coded signal for reconstructing said texture information; and means for combining said edge image and the reconstructed texture information for reconstructing said video information.

18. Apparatus according to claim 17, wherein said means for decoding said first coded signal includes means for PCM decoding said first coded signal, means for up-sampling the PCM decoded signal, and means for low-pass filtering the up-sampled signal.

19. A method for transmitting video information that includes local luminance information, luminance edge information and texture information, comprising the steps of:

transmitting a first coded signal that has been generated by coding said local luminance information that includes a smooth component of an input video signal;

transmitting a second coded signal that has been generated by chain coding said luminance edge information that includes a contour component of said input video signal; and transmitting a third coded signal that has been generated by coding said texture information that includes a component of said input video signal other than said smooth and contour components, said third coded signal having been generated as a difference between said input video signal and a local decoded image signal which is based on said local luminance information and said second coded signal after said second coded signal has been locally decoded.

20. The method according to claim 19, wherein amplitude information in each chain of said second coded signal is represented by one value.

21. The method according to claim 19, wherein each chain of said second coded signal includes chain length information, coordinate information of a first pixel in said each chain, and relative position information of pixels other than said first pixel in said each chain.

22. A method for detecting an edge in video information represented by an input video signal, said method comprising the steps of:

differentiating said input video signal;

generating an adaptive threshold value for comparing to the differentiated video signal;

extracting from the differentiated video signal a video signal component having a value higher than said adaptive threshold value;

detecting change points from the extracted video signal component; and replacing at least two redundant points in said change points with a single point which is generated midway between said two redundant points.

23. Apparatus for detecting an edge in video information represented by an input video signal, comprising:

means for differentiating said input video signal;

means for generating an adaptive threshold value for comparing to the differentiated video signal;

means for extracting from the differentiated video signal a video signal component having a value higher than said adaptive threshold value;

means for detecting change points from the extracted video signal component; and means for replacing at least two redundant points in said change points with a single point which is generated midway between said two redundant points.

* * * * *